United States Patent [19]
Underhill

[11] Patent Number: 5,602,452
[45] Date of Patent: Feb. 11, 1997

[54] REGENERATION CURRENT-SPIKE LIMITER FOR SIX-STEP MOTOR DRIVES

[75] Inventor: Mark J. Underhill, East Aurora, N.Y.

[73] Assignee: Moog Inc., East Aurora, N.Y.

[21] Appl. No.: 531,172

[22] Filed: Sep. 19, 1995

[51] Int. Cl.$^6$ .................................................. H02P 6/00
[52] U.S. Cl. ........................................ 318/439; 318/254
[58] Field of Search .................................... 318/138, 254, 318/439

[56] References Cited

U.S. PATENT DOCUMENTS

| | | | |
|---|---|---|---|
| 5,119,000 | 6/1992 | Schultz | 318/254 |
| 5,220,259 | 6/1993 | Werner et al. | 318/432 |
| 5,231,338 | 7/1993 | Bulgarelli et al. | 318/254 |
| 5,291,105 | 3/1994 | Salerno et al. | 318/254 |
| 5,334,921 | 8/1994 | Wehberg | 318/254 X |
| 5,428,273 | 6/1995 | Doring | 318/138 |

*Primary Examiner*—Bentsu Ro
*Attorney, Agent, or Firm*—Phillips, Lytle, Hitchcock, Blaine & Huber

[57] ABSTRACT

The present invention provides an improved current spike limiting circuit (49) for a DC brushless motor controller (21) arranged to operate in six-step mode. The controller has three electrically-controllable first switches ($A_U$, $B_U$, $C_U$) arranged between a supply voltage (22) and a terminal (26, 28, 29) of a respective one of the field coils (A, B, C), and has three electrically-controllable second switches ($A_L$, $B_L$, $C_L$) severally arranged between a ground (23) and the field coils. The improved circuit broadly comprises a regeneration polarity comparator (50) for sensing regenerative operation of the motor; a tachometer (58) for sensing motor speed; and an adjustable pulse generator (55) from momentarily opening a conducting one of the first switches for a predetermined time interval ($t_p$) after a predetermined delay ($t_d$) following a point in time ($t_s$) when one of the second switches is closed and another of the second switches is opened. The durations of such momentary opening and the length of the predetermined delay are controlled as functions of sensed regenerative operation and motor speed. Hence, excessive current spikes in the switches are prevented.

5 Claims, 7 Drawing Sheets

REGENERATION CURRENT-SPIKE LIMITER FOR SIX-STEP MOTOR DRIVES

TECHNICAL FIELD

The present invention relates generally to drives for DC brushless motors, and, more particularly, to an improved six-step motor drive therefor that is capable of limiting current spikes that may occur during an "aiding" or regenerative load and that might possibly damage solid-state switching components.

BACKGROUND ART

Brushless DC motors typically have a permanent magnet rotor and three Y-connected field coils that are energized sequentially in series-connected pairs to form a rotating magnetic field to drive the rotor. Commutation of the coils is usually effected by three pairs of solid-state switches. These switches connect the terminals of each coil to either the power supply bus, or to ground, as appropriate. In the simplest control scheme (i.e., six step, trapezoidal control), these switches are operated as a function of the angular position of the rotor to sequentially connect the field coils, in various series-connected combinations, between the power source and ground. The currents supplied to the motor coils create the torque developed by the motor. These currents are controlled by pulse-width-modulating the various switches, while feeding back the resulting voltage drop across a current-sensing resistor in a common return path to ground. The maximum value of motor current is usually determined by a limiting circuit, that opens the conducting switches when-ever the current-sensing voltage exceeds a preset amount.

However, it is believed necessary to protect the various solid-state switching elements that are used to control the current supply from excessive current spikes. These current spikes can occur with an "aiding" (i.e., regenerative) load.

Accordingly, it would be generally desirable to provide an improved switching controller for such DC brushless motors, which controller also functions to limit undesired current spikes.

DISCLOSURE OF THE INVENTION

With parenthetical reference to the corresponding parts, portions or surfaces of the disclosed embodiment, merely of purposes of illustration, and not by way of limitation, the present invention broadly provides an improved current-spike limiter (49) for use in a switching controller (21) for a DC brushless motor having Y-connected field coils (A, B, C), and having three electrically-controllable first switches ($A_U$, $B_U$, $C_U$), and three electrically-controllable second switches ($A_L$, $B_L$, $C_L$). Each first switch is connected between a positive supply voltage (22) and a terminal (26, 28, 29) of a respective one of the field coils (A, B, C), respectively. Each second switch is connected ground (23) and a terminal (26, 28, 29) of a respective one of the field coils. The switches are sequentially operated in a six-step mode to drive the motor.

The improvement provides an improved current spike limiter (49), which broadly includes: means (50) for sensing regenerative operation of the motor, as in the case of "aiding" load; means (58) for sensing motor speed; and means (55) for momentarily opening a conducting one of the first switches for a predetermined time ($t_p$) after a predetermined delay ($t_d$) following a point in time ($t_s$) at which one of the second switches is closed and another of the second switches is opened. The duration of such momentary opening and the length of said predetermined delay are controlled as functions of sensed regenerative operation and said motor speed such that excessive current spikes in the conducting first switches will be eliminated.

In the preferred form, the means (50) for sensing regenerative operation of the motor includes a voltage comparator that senses the polarity of the motor velocity command signal relative to the motor current feedback signal. The means (58) for sensing the motor speed may simply be a tachometer arranged to generate a signal proportional to motor speed. Alternatively, the means for sensing motor speed may include a means for differentiating the output signal from an angular position sensor so as to produce a signal proportional to motor speed. The means (55, 56) for momentarily opening the conducting one of the first switches may include an adjustable electronic pulse generator capable of producing an output voltage pulse after a time delay following receipt of a trigger signal, the time duration of the pulse ($t_p$) and the time delay ($t_d$) each being a function of motor speed, and an AND gate operatively arranged to pass a trigger signal whenever the gate receives a first signal indicating regenerative operation of the motor, in combination with a second signal indicating that the motor speed has exceeded a predetermined threshold, the trigger being generated at a point in time when one of the second switches is opened and another of the second switches is closed.

Accordingly, the present invention provides an improved drive circuit for the operation of six-step DC brushless motors.

Another object is to provide an improved switching controller for a DC brushless motor, which controller includes means for preventing excessive and undesired current spikes that may possibly damage some of the solid-state components of the controller.

These and other objects and advantages will become apparent from the foregoing and ongoing written specification, the drawings, and the appended claims.

DESCRIPTION OF THE PREFERRED EMBODIMENT

Figure 1:
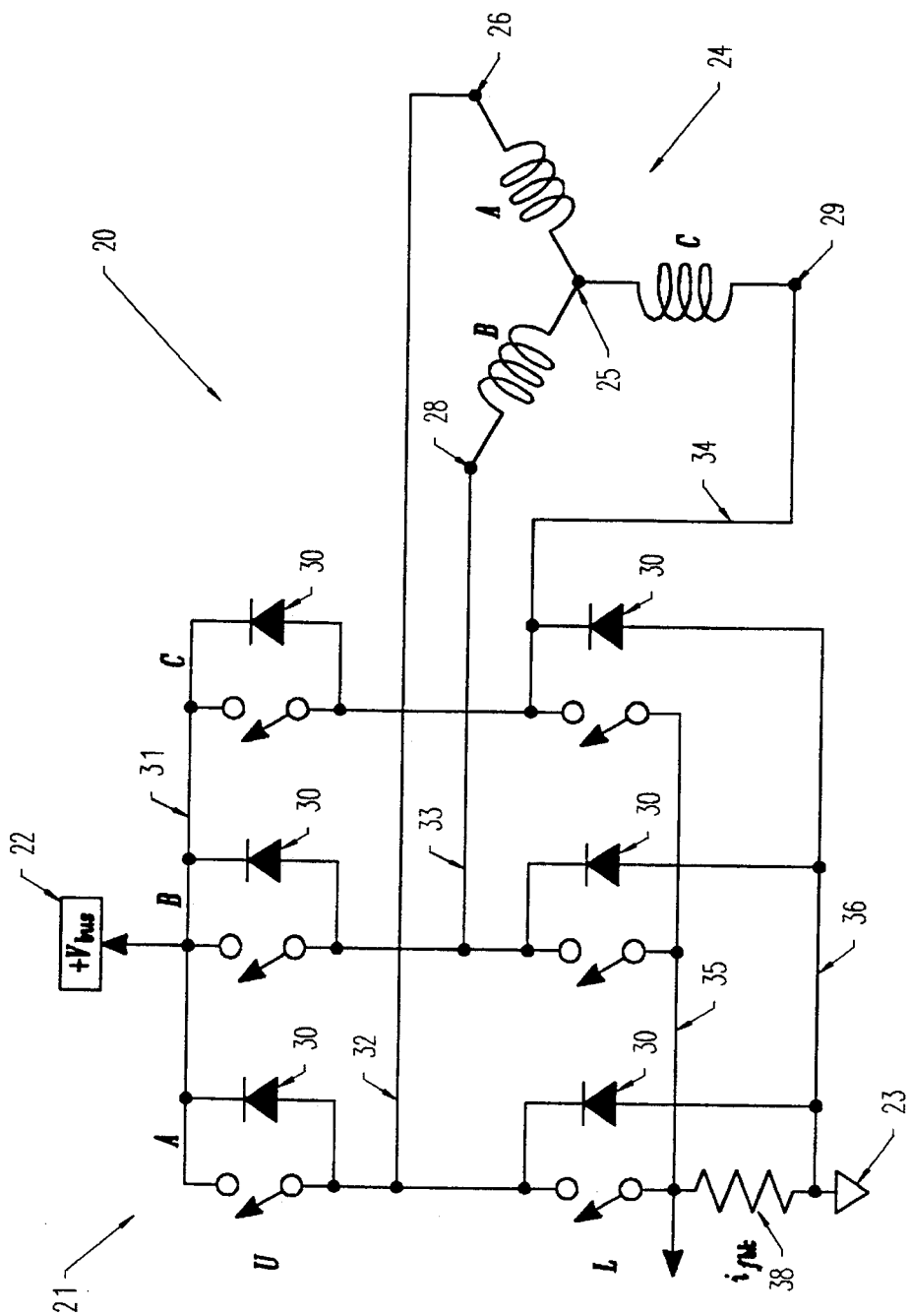
FIG. 1 is a schematic view of a prior art switching controller in association with three Y-connected field coils of a DC brushless motor, this view showing all six switches as being opened.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly to FIG. 1 thereof, a prior art DC brushless motor controller, generally indicated at 20, is shown as broadly including a switching circuit or controller, generally indicated at 21, operatively arranged between a positive voltage source 22 (labeled $+V_{bus}$), and a negative voltage source or ground 23. The switching circuit is shown in association with the Y-connected coils of a brushless DC motor, generally indicated at 24. These coils are severally indicated at A, B and C, respectively. Each coil is shown as having two terminals. The innermost terminals are connected at a common node 25. The outermost terminals of coils A, B and C are indicated at 26, 28 and 29, respectively. The DC brushless motor also includes a rotor that has been omitted from the drawings in the interest of clarity.

The switching controller 21 is shown as having a total of six electrically-controllable switches, each embraced by a directional diode 30. For the sake of convenience, these switches are arranged in upper and lower banks of three horizontally-spaced switches each. The individual switches of each bank are labeled "A", "B" and "C", respectively, with the subscripts "U" or "L" indicating whether a particular switch is in the upper or lower bank, respectively. In practice, each of these switches may be a transistor switch, or an equivalent solid-state device. Each switch has one terminal connected to a common bus 31 that is connected to the positive voltage source 22. The other terminal of switch $A_U$ is connected via line 32 with terminal 26 of coil A; the other terminal of switch $B_U$ is connected via conductor 33 with terminal 28 of coil B; and the other terminal of upper switch $C_U$ is connected by conductor 34 with terminal 29 of coil C. Lower switch $A_L$ has one terminal connected to conductor 32, and has another terminal connected to a common bus 35. Switch $B_L$ has one terminal connected to conductor 33, and has another terminal connected to common bus 35. Switch $C_L$ has one terminal connected to conductor 34, and has another terminal connected to common bus 35. Each of the lower-switch diodes 30 is connected between the terminal common to conductors 32, 33, 34, respectively, and to a common grounded conductor 36. A current-sensing resistor 38 is operatively arranged between conductors 35 and 36.

Figure 2:
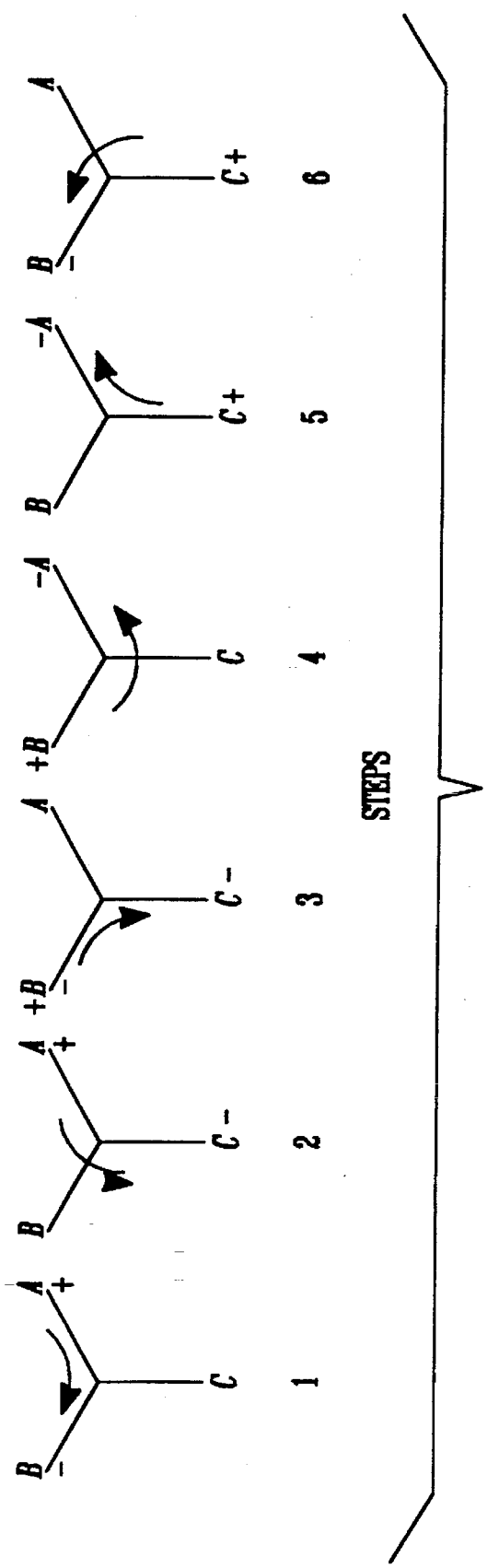
FIG. 2 is a schematic view illustrating the steps of sequential operation of various pairs of series-connected coils to provide a rotating magnetic field for driving the rotor.

As previously noted, the particular circuit shown in FIG. 1 is known in the prior art. The switches are operated to sequentially energize various series-connected pairs of motor coils to form a rotating magnetic field for driving the rotor (not shown). The six-step mode of operation is schematically indicated in FIG. 2. In step 1, current $i_{AB}$ flows through coils A and B; in step 2, current $i_{AC}$ flows through coils A and C; in step 3, current $i_{BC}$ flows through coils B and C; in step 4, current $i_{BA}$ flows through coils B and A; in step 5, current $i_{CA}$ flows through coils C and A; and, finally, in step 6, current $i_{CB}$ flows through coils C and B.

In the prior art controller shown in FIG. 1, the switching operation was typically effected as a function of the angular position of the rotor. In other words, a resolver or equivalent was used to determine the angular position of the rotor, and that angular position was then supplied to the controller to actuate the various switches in the necessary sequence to produce the six-step drive schematically indicated in FIG. 2.

Figure 3:
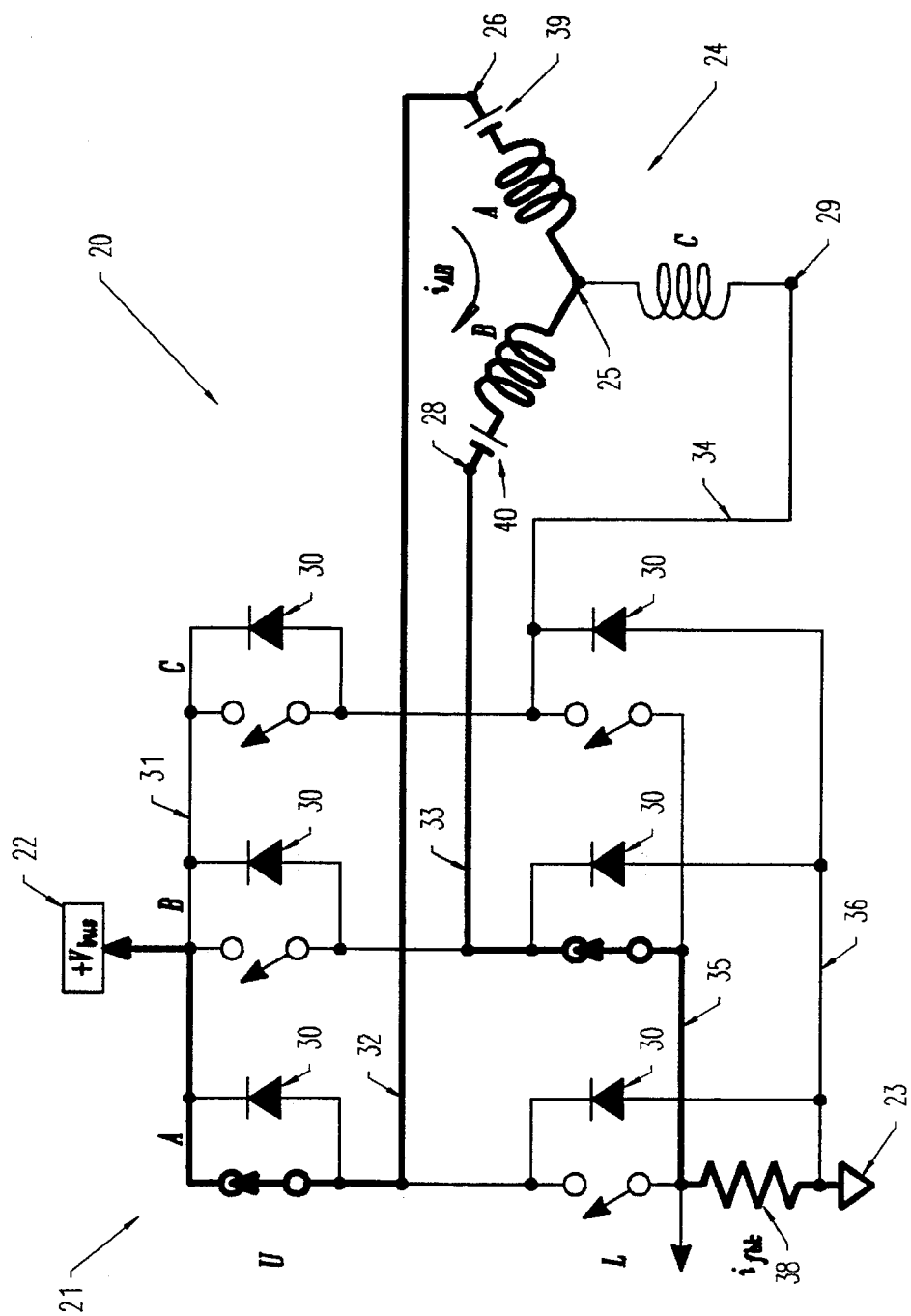
FIG. 3 is a view of the prior art controller shown in FIG. 1, but showing the current path when switches $A_U$ and $B_L$, have been closed, this being just prior to the occurrence of a commutation point.

FIG. 3 illustrates the condition of the prior art controller shown in FIG. 1, just prior to commutation, with the darkened lines indicating the path of current flow. In this arrangement, switches $A_U$ and $B_L$ have been closed, while the other switches remain opened. Hence, current flows from the source 22 through closed switch $A_U$, conductor 32, coils A and B (i.e., step 1 in FIG. 2), closed switch $B_L$ and resistor 38 to ground. In this instance, the motor is schematically shown has having batteries 39, 40 in series with coils A and B, respectively, as a result of the motor back EMF. This current is present as a result of the previous conduction, and the inductance of the coils. The critical difference is that, during "aiding" load operation, the polarity of the back EMF is reversed.

Figure 4:
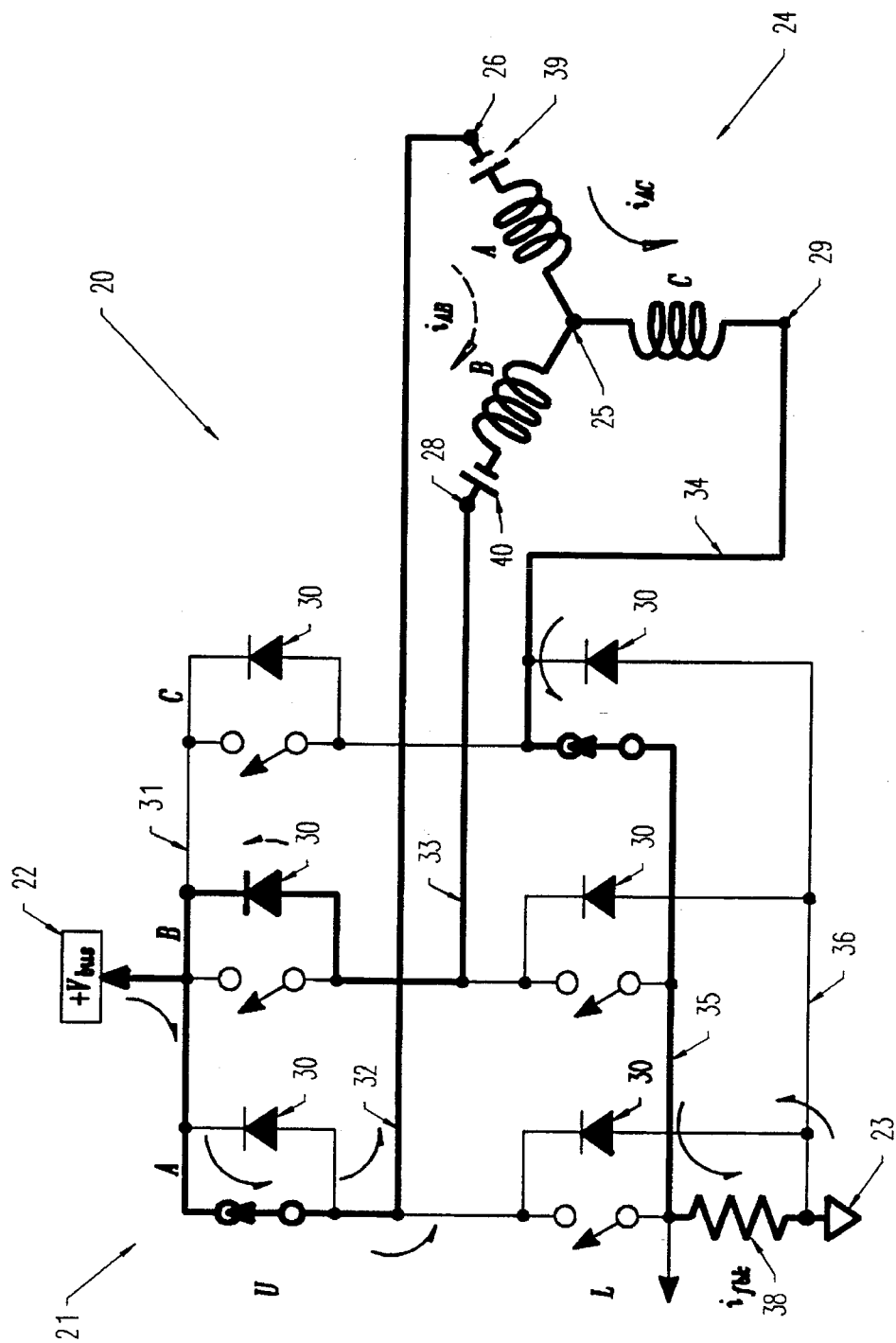
FIG. 4 is a view of the prior art controller shown in FIG. 1, but showing the current path immediately after switch $B_L$ has been opened and switch $C_L$ has been closed.

FIG. 4 illustrates the condition of the prior art controller immediately after a commutation point. The difference here is that the back EMF voltage, which normally acts to reduce the current in coils A and B, instead contributes to this current's persistence after commutation. In other words, FIG. 4 illustrates the condition of the circuitry immediately after a commutation point ($t_s$) when switch $A_U$ remains closed, but switch $B_L$ has been opened and switch $C_L$ has been closed. In this situation, current may flow from source 22 through closed switch $A_U$, conductor 32, coils A and C, closed switch $C_L$, and conductor 35, through feedback resistor 38 to ground. At the same time, the collapsing current $i_{AB}$ in coils A and B due to their past energization, may flow through conductor 33, through the diode associate with switch $B_U$ to enter bus conductor 31. This current will add to the current flowing through switch $A_U$, and may cause an undesired current spike that may possibly damage the solid-state switching components.

Figure 5:
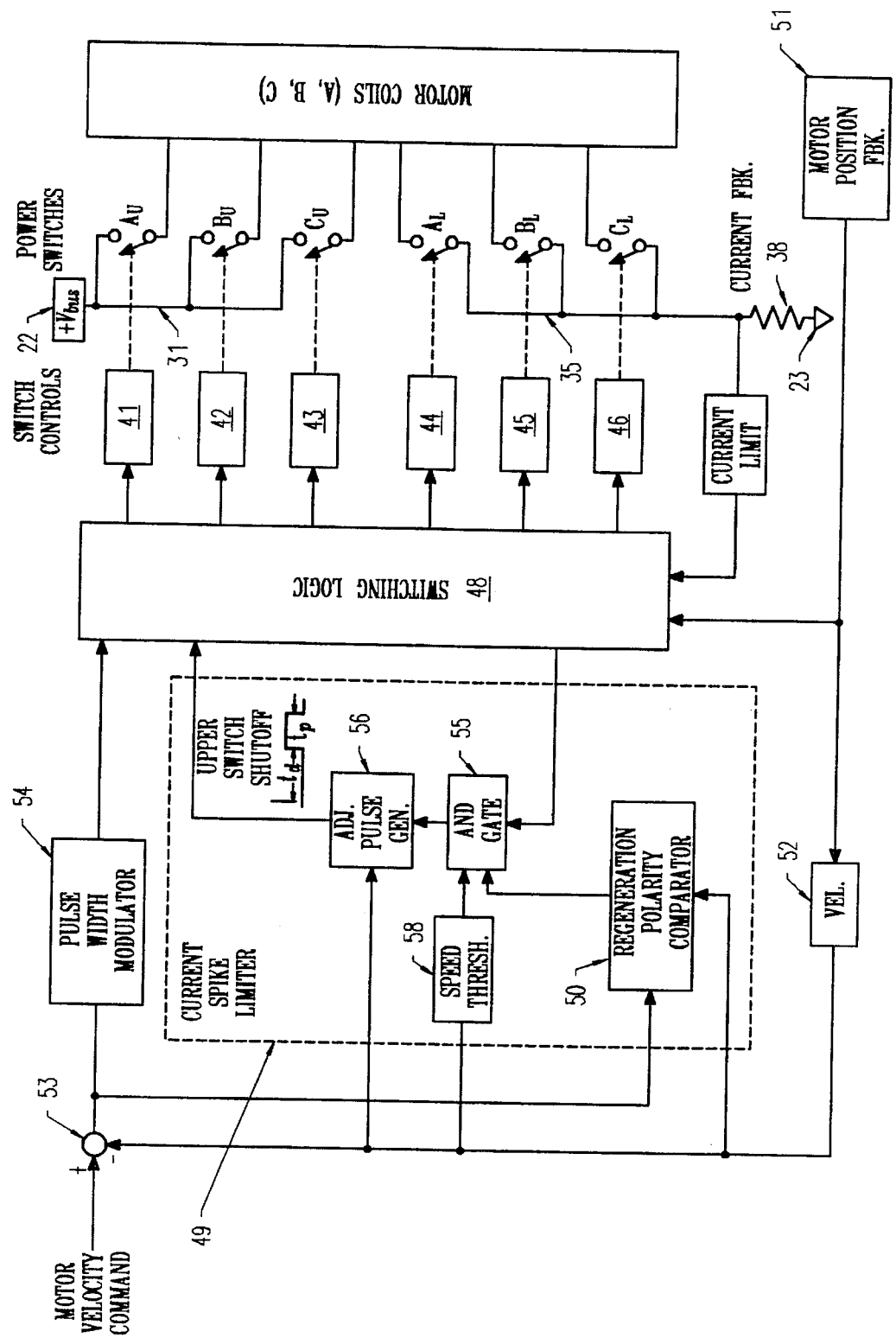
FIG. 5 is a block diagram showing the closed servoloop for operating the improved controller, this view also showing the current spike limiter.

FIG. 5 is a block diagram representing the various elements of the improved apparatus. The motor coils are shown as being connected via the six switches, again indicated at $A_U$, $B_U$, $C_U$ and $A_L$, $B_L$, $C_L$, to switch controls 41, 42, 43 and 44, 45, 46, respectively. Each of these switch controls is in turn operated by a switching logic circuit, indicated at 48. The invention provides an improved current spike limiter, generally indicated within dashed lines 49. The current spike limiter includes a regeneration polarity comparator 50, which is provided with the sensed velocity signal and the velocity error signal output from summing point 53. A position transducer 51 is arranged to sense the angular position of the rotor, and to supply the derivative thereof (i.e., $\omega=d\theta/dt$) as a velocity signal, indicated at block 52, as a negative feedback signal to a summing point 53. A motor velocity command signal is supplied as a positive input to summing point 53. Summing point 53 algebraically sums the command and feedback signals, and provides an error signal to a pulse width modulator 54, that, in turn, provides its output signal to switching logic circuit 48. The velocity signal is also supplied to regeneration polarity comparator 50, and to box 58, labeled "speed thresh". Comparator 50 therefore compares the polarity of the velocity error and velocity feedback signals, and supplies its output to an AND gate 55. The "speed thresh" device compares the actual feedback velocity of the rotor with a minimum threshold velocity. Only if the actual velocity exceeds the threshold velocity will box 58 supply an output signal to AND gate 55. AND gate 55 receives another input signal from the switching logic circuit 48, representing the switch transfer pulse. AND gate 55 is arranged to provide its output signal to an adjustable pulse generator 56, that also receives a feedback velocity signal of the rotor. Pulse generator 56 is arranged to provide an appropriate signal to switching logic circuit 48, representing a command to momentarily open a switch in the upper bank for a predetermined time period ($t_p$) after a predetermined delay period ($t_d$) following the commencement ($t_s$) of a pulse, where $t_p$ and $t_d$ are functions of the motor speed ($\epsilon$).

Figure 6:
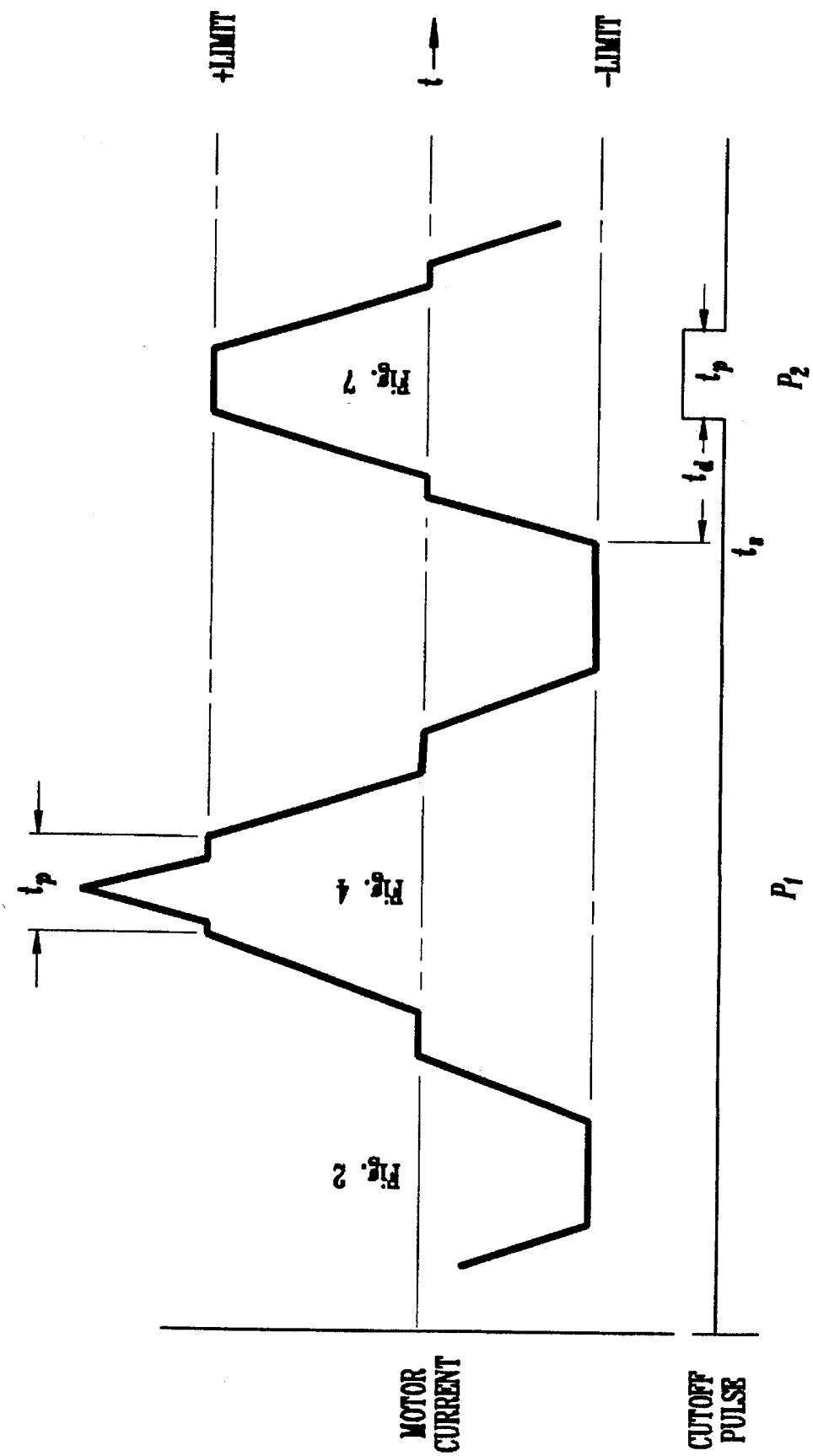
FIG. 6 is representative plot of motor current (ordinate) vs. time (abscissa), and comparatively illustrates two sequential waveforms, the first waveform showing the undesired current spike caused by the situation shown in FIG. 3, and the second waveform showing such spike as having been prevented due to the operation of the present invention.

FIG. 6 is a plot of motor current vs. time, and illustrates schematically two sequential pulses, severally indicated at $P_1$ and $P_2$, respectively. Pulse $P_1$ represents a pulse attributable to the prior art controller shown in FIG. 3. Pulse $P_2$ is representative of the operation of the new controller. Assuming conventional six-step trapezoidal control, pulse $P_1$ is shown as having a peak that exceeds the current limit due to the collapsing current in the previously-energized coils immediately following commutation. To obviate this peak, the present invention provides an improved current-spike eliminator that opens the conducting upper switch element at a point where the over current spike is about to begin, this being a predetermined time ($t_d$) after the lower element switch over ($t_s$), which is a function of motor speed ($\epsilon$), and holds it open for the predetermined time duration ($t_p$) of the spike. Thus, in FIG. 6, the improved circuitry functions to prevent the current from exceeding the current limit, by opening the upper switch for a time period $t_p$ that occurs a specified time duration, $t_d$, following the beginning of the pulse $t_s$. Since the current spike is prevented, and the current does not exceed its positive limit, the various solid-state components of the switching circuitry are protected.

Figure 7:
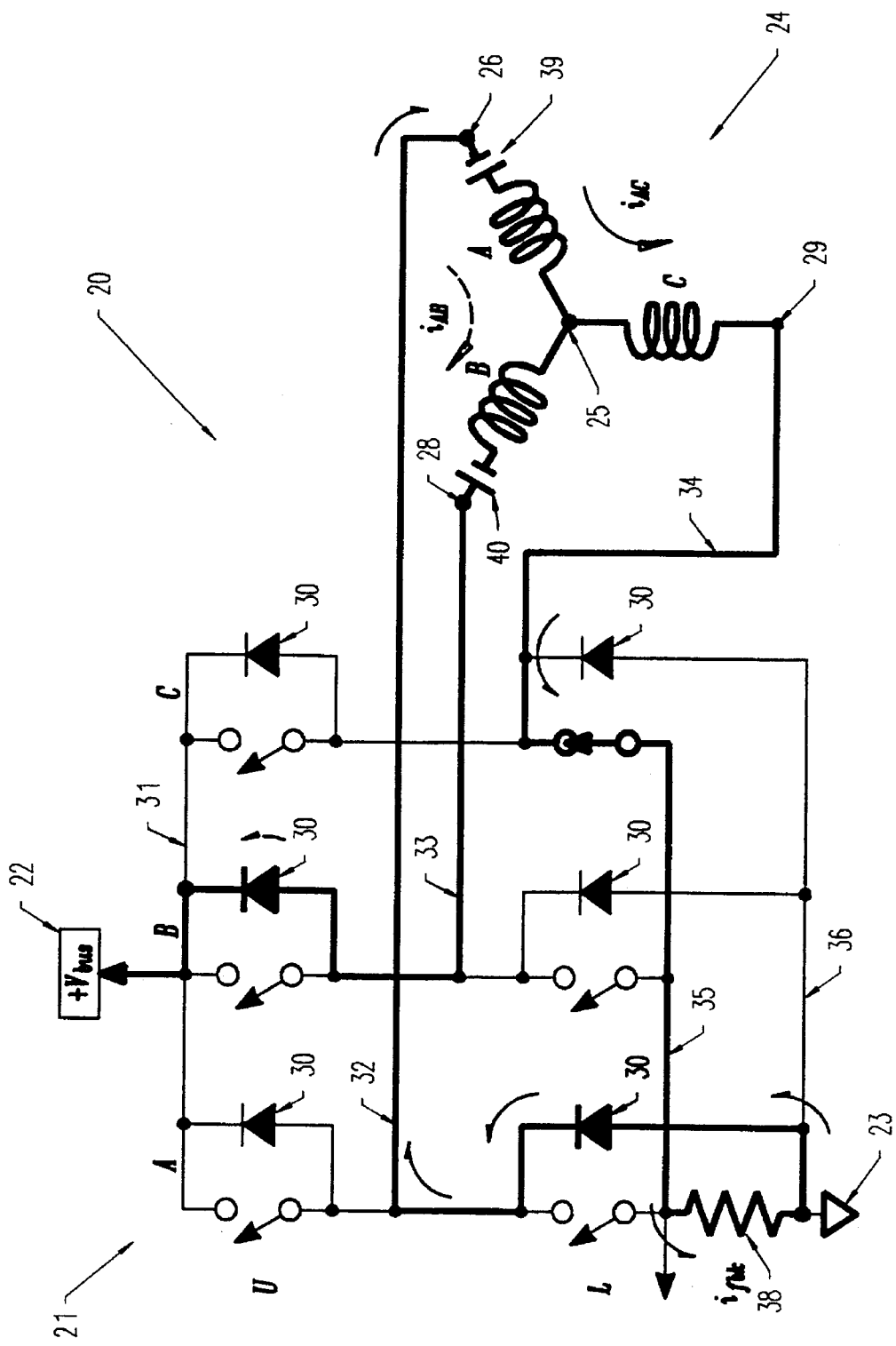
FIG. 7 is a schematic view of the improved operation, showing switches $B_U$ and $C_L$ as having been closed, and showing the collapsing current in coils 26 and 25 as being modulated by switch $C_L$.

The operation of the improved device is representatively shown in FIG. 7. There, switch $A_U$ is shown as having been opened during the time period $t_p$. Hence, the collapsing current $i_{AB}$ in previously-energized coils A and B may flow through the diodes associated with switches $B_U$ and $A_L$ to the voltage source. At the same time, the current flowing through coils A and C may flow through conductor 34, closed switch $C_L$, resistor 38 to the ground. The magnitude of current $i_{AC}$ is modulated by selectively opening and closing lower switch $C_L$.

Therefore, the present invention functions to sense regenerative operation of the motor, to sense the motor speed, and to momentarily open the conducting one of the upper switches for a predetermined time ($t_p$) after a predetermined delay ($t_d$) following the point in time ($t_s$) when one of the second switches is turned "off" and another of the second switches is turned "on". The times $t_p$ and $t_d$ are controlled as functions of sensed regenerative operation and the rotor speed. Therefore, the improved invention functions to prevent the occurrence of current spike in six-step motor drives. By eliminating such spikes, the improved circuitry functions to protect the various solid-state components of the switching apparatus and motor controller.

The present invention contemplates that many changes and modifications may be made. For example, the velocity feedback signal may be provided by a velocity sensor, or, as indicated in the preferred embodiment, by sensing rotor position and differentiating that position to provide velocity (i.e., $e=d\omega/dt$) of various types of comparators and AND gates may be used. While the switches may be transistors, other types of switches may be substituted therefor.

Therefore, while the presently-preferred form of the inventive apparatus has been shown and described, and several modifications thereof discussed, persons skilled in this art will readily appreciate the various additional changes and modifications may be made without departing from the spirit of invention, as defined and differentiated by the following claims.

What is claimed is:

1. In a switching controller for a DC brushless motor having Y-connected field coils, having three electrically-controllable first switches, each first switch connected between a positive supply voltage and a terminal of a respective one of said field coils, and having three electrically-controllable second switches, each second switch connected between a negative supply voltage and another terminal of a respective one of said field coils, said switches being sequentially operated in a six-step mode to drive said motor, the improvement which comprises:

means for sensing regenerative operation of said motor;
   means for sensing motor speed;
   means for momentarily opening a conducting one of said first switches for a predetermined time after a predetermined delay following a point in time when one of said second switches is closed and another of said second switches is opened, the duration of such momentary opening and the length of said predetermined delay being controlled as functions of said sensed regenerative operation and said motor speed;
   whereby excessive current spikes in said conducting first switch will be eliminated.

2. The improvement as set forth in claim 1 wherein the means for sensing said regenerative operation of said motor includes a voltage comparator that compares the polarity of the motor velocity command signal with the polarity of the motor velocity error signal.

3. The improvement as set forth in claim 1 wherein the means for sensing said motor speed includes a tachometer for generating a signal proportional to motor speed.

4. The improvement as set forth in claim 1 wherein the means for sensing said motor speed comprises a means for differentiating the output signal from a motor angular displacement sensor so as to produce a signal proportional to motor speed.

5. The improvement as set forth in claim 1 wherein the means for momentarily opening the conducting one of said first switches includes an adjustable electronic pulse generator circuit capable of producing an output voltage pulse after a time delay following receipt of a trigger signal, the time duration of said pulse and said time delay each being a function of a signal proportional to the motor speed, and an AND gate operatively arranged to pass a trigger signal whenever said gate receives a first signal indicating regenerative operation of the motor, in combination with a second signal indicating that the motor speed has exceeded a predetermined threshold, said trigger signal being generated whenever one of said second switches is opened and another of said second switches is closed.

* * * * *